US012405625B2

(12) United States Patent
Lai et al.

(10) Patent No.: US 12,405,625 B2
(45) Date of Patent: Sep. 2, 2025

(54) LOW-DROPOUT REGULATOR SYSTEM AND CONTROL METHOD THEREOF

(71) Applicant: Realtek Semiconductor Corporation, Hsinchu (TW)

(72) Inventors: Yen-Po Lai, Hsinchu (TW); Chih-Lung Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 204 days.

(21) Appl. No.: 18/066,269

(22) Filed: Dec. 14, 2022

(65) Prior Publication Data

US 2023/0229184 A1 Jul. 20, 2023

(30) Foreign Application Priority Data

Jan. 14, 2022 (TW) ................................. 111101715

(51) Int. Cl.

*G05F 1/59* (2006.01)
*G05F 1/46* (2006.01)
*G05F 1/575* (2006.01)

(52) U.S. Cl.

CPC ................ *G05F 1/59* (2013.01); *G05F 1/462* (2013.01); *G05F 1/468* (2013.01); *G05F 1/575* (2013.01)

(58) Field of Classification Search

CPC .......... G05F 1/462; G05F 1/468; G05F 1/575; G05F 1/59

See application file for complete search history.

(56) References Cited

U.S. PATENT DOCUMENTS

| | | | |
|---|---|---|---|
| 7,402,987 B2 | 7/2008 | Lopata | |
| 9,459,642 B2 | 10/2016 | Chen et al. | |
| 2009/0027110 A1* | 1/2009 | Lee ......................... | G05F 1/563 327/538 |

(Continued)

FOREIGN PATENT DOCUMENTS

| | | |
|---|---|---|
| CN | 112148055 A | 12/2020 |
| TW | 200935971 A | 8/2009 |
| TW | 201011492 A | 3/2010 |

OTHER PUBLICATIONS

J. Park et al., "32.4 A 0.4-to-1.2V 0.0057mm2 55fs-Transient-FoM Ring-Amplifier-Based Low-Dropout Regulator with Replica-Based PSR Enhancement," 2020 IEEE International Solid-State Circuits Conference—(ISSCC), 2020, pp. 492-494, doi: 10.1109/ISSCC19947.2020.9063147.

*Primary Examiner* — Jue Zhang
(74) *Attorney, Agent, or Firm* — CKC & Partners Co., LLC

(57) ABSTRACT

A low-dropout regulator system includes a low-dropout regulator. A comparator circuit generates a comparison voltage according to a reference voltage and a feedback voltage. An amplifier circuit generates an amplifying voltage according to the comparison voltage. A transistor receives an input voltage and is controlled by the amplifying voltage to generate an output voltage at an output terminal. A first resistor circuit is coupled between a first node and a ground terminal. A second resistor circuit is coupled between the output terminal and the first node. At a start-up timing point of the low-dropout regulator, a resistance value of the second resistor circuit is a first resistance value. After the input voltage reaches a maximum voltage, the resistance value of the second resistor circuit is a second resistance value. The second resistance value is larger than the first resistance value.

16 Claims, 6 Drawing Sheets

110

(56) References Cited

U.S. PATENT DOCUMENTS

| | | | | |
|---|---|---|---|---|
| 2009/0302811 | A1* | 12/2009 | Nihei | G05F 1/575 323/217 |
| 2016/0062376 | A1* | 3/2016 | Kim | G05F 1/575 323/280 |
| 2021/0080984 | A1* | 3/2021 | Satou | G05F 1/648 |

* cited by examiner

110

LOW-DROPOUT REGULATOR SYSTEM AND CONTROL METHOD THEREOF

RELATED APPLICATIONS

This application claims priority to Taiwanese Application Serial Number 111101715, filed Jan. 14, 2022, which is herein incorporated by reference.

BACKGROUND

Technical Field

The present disclosure relates to a low-dropout regulator system. More particularly, the present disclosure relates to a low-dropout regulator system and a control method that can avoid serious undershoot problem of the output voltage.

Description of Related Art

With developments of technology, various integrated circuits have been developed. However, performance of many integrated circuits can be further improved.

For example, in some related approaches, a low dropout regulator may be in out-of-lock state for a long period. At this time, if a load current increases, an output voltage of the low dropout regulator may suffer from a serious undershoot problem. In addition, in some related approaches, when the low dropout regulator changes from a light-load mode to a heavy-load mode, the output voltage of the low dropout regulator may suffer from a serious undershoot problem.

SUMMARY

Some aspects of the present disclosure are to provide a low-dropout regulator system. The low-dropout regulator system includes a low-dropout regulator. The low-dropout regulator includes a comparator circuit, an amplifier circuit, a transistor, a first resistor circuit, and second resistor circuit. The comparator circuit is configured to generate a comparison voltage according to a reference voltage and a feedback voltage. The amplifier circuit is configured to generate an amplifying voltage according to the comparison voltage. The transistor is configured to receive an input voltage and controlled by the amplifying voltage to generate an output voltage at an output terminal. The first resistor circuit is coupled between a first node and a ground terminal. The feedback voltage is generated at the first node. The second resistor circuit is coupled between the output terminal and the first node. At a start-up timing point of the low-dropout regulator, a resistance value of the second resistor circuit is a first resistance value. After the input voltage reaches a maximum voltage, the resistance value of the second resistor circuit is a second resistance value. The second resistance value is larger than the first resistance value.

Some aspects of the present disclosure are to provide a low-dropout regulator system. The low-dropout regulator system includes a low-dropout regulator. The low-dropout regulator includes a comparator circuit, an amplifier circuit, a transistor, a first resistor circuit, and a second resistor circuit. The comparator circuit is configured to generate a comparison voltage according to a reference voltage and a feedback voltage. The amplifier circuit is configured to generate an amplifying voltage according to the comparison voltage. The transistor is configured to receive an input voltage and controlled by the amplifying voltage to generate an output voltage at an output terminal. The first resistor circuit is coupled between a first node and a ground terminal. The feedback voltage is generated at the first node. The second resistor circuit is coupled between the output terminal and the first node. When the low-dropout regulator changes from a light-load mode to a heavy-load mode, a resistance value of the second resistor circuit is changed from a first resistance value to a second resistance value. The second resistance value is smaller than the first resistance value.

Some aspects of the present disclosure are to provide a control method for a low-dropout regulator system. The control method includes following operations: controlling, by a digital controller, a resistor voltage-dividing ratio of a low-dropout regulator to be a first ratio value at a start-up timing point of the low-dropout regulator; and controlling, by the digital controller, the resistor voltage-dividing ratio to be a second ratio value after an input voltage of the low-dropout regulator reaches a maximum voltage. The second ratio value is smaller than the first ratio value.

As described above, in the present disclosure, the serious undershoot problem of the output voltage can be avoided to improve the performance of the low-dropout voltage regulator.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
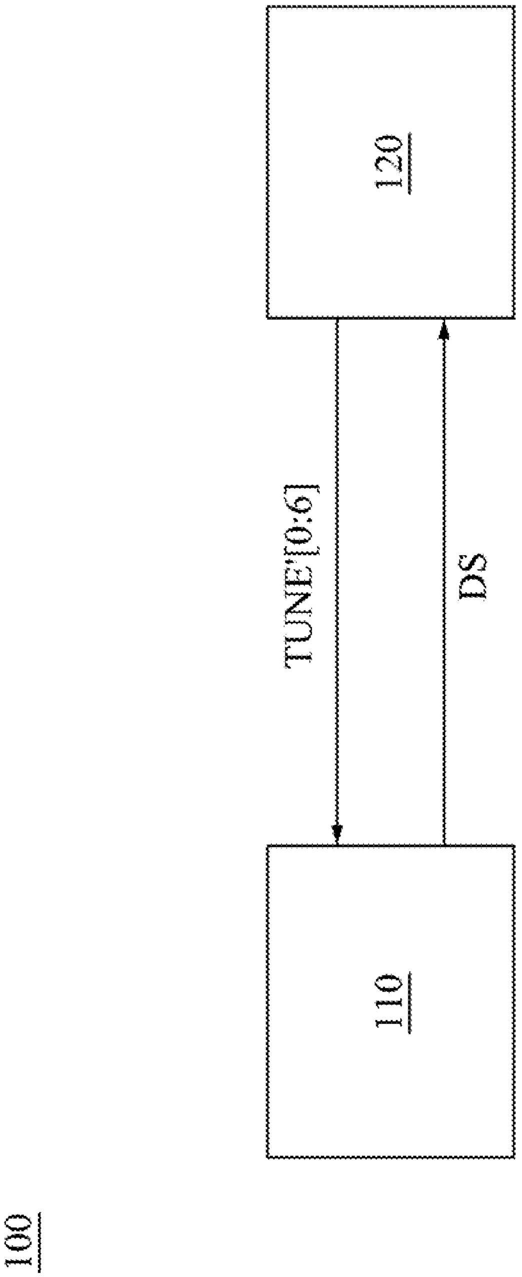
FIG. 1 is a schematic diagram of a low-dropout regulator system according to some embodiments of the present disclosure.

Reference is made to FIG. 1. FIG. 1 is a schematic diagram of a low-dropout regulator system 100 according to some embodiments of the present disclosure.

As illustrated in FIG. 1, the low-dropout regulator system 100 includes the low-dropout regulator 110 and a digital controller 120. The digital controller 120 is coupled to the low-dropout regulator 110.

Figure 2:
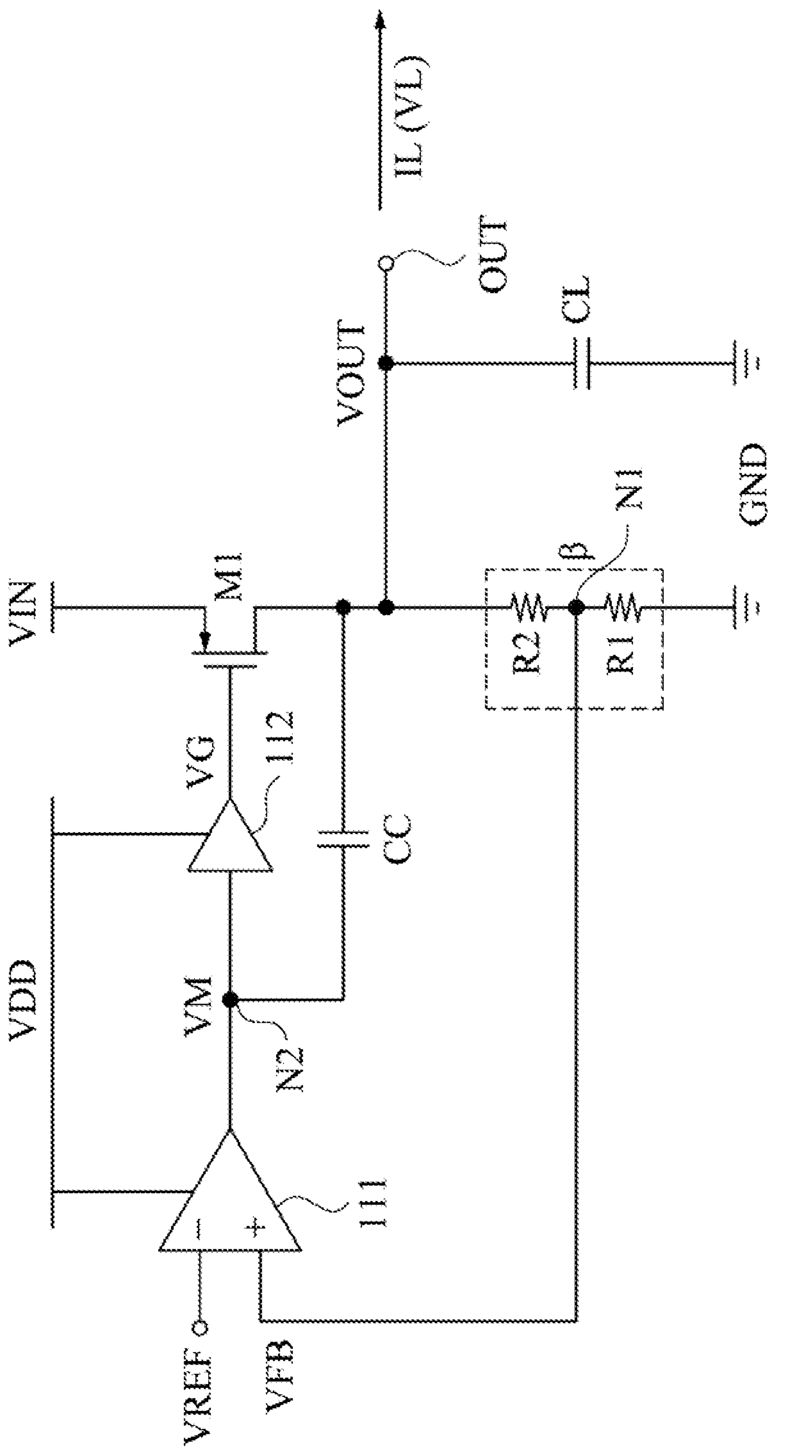
FIG. 2 is a schematic diagram of a low-dropout regulator according to some embodiments of the present disclosure.

Reference is made to FIG. 2. FIG. 2 is a schematic diagram of the low-dropout regulator 110 according to some embodiments of the present disclosure.

An output terminal OUT of the low-dropout regulator 110 can be coupled to a load, and the low-dropout regulator 110 can generate an output voltage VOUT at the output terminal OUT according to an input voltage VIN and provide the output voltage VOUT to the load. When the load starts to operate, a load current IL increases and a load voltage VL is kept to substantially be equal to the output voltage VOUT.

Reference is made to FIG. 1 again. The digital controller 120 is used to control the low-dropout regulator 110. In some embodiments, the digital controller 120 can detect the low-dropout regulator 110 to receive a detection result signal DS, set adjustment signals (e.g., adjustment signals TUNE [0:6]) according to the detection result signal DS, and generate inversion adjustment signals TUNE'[0:6] according to the adjustment signals to control the low-dropout regulator 110. In another embodiment, the digital controller 120 controls the low-dropout regulator 110 directly according to the adjustment signals TUNE[0:6]. As will be appreciated by persons skilled in the art, in some embodiments, the digital controller 120 will preferably be implemented through circuits (such as dedicated circuits or general purpose circuits), which will typically comprise transistors or other circuit elements that are configured in such a way as to control the operation of the circuitry in accordance with the functions and operations described herein.

As illustrated in FIG. 2, the low-dropout regulator 110 includes a comparator circuit 111, an amplifier circuit 112, a transistor M1, a resistor circuit R1, a resistor circuit R2, a load capacitor CL, and a compensation capacitor CC.

In this example, the transistor M1 is implemented by a P-type transistor, but the present disclosure is not limited thereto. In some other embodiments, the transistor M1 can be implemented by a N-type transistor. In these other embodiments, an output terminal of the amplifier circuit 112 can be coupled to an inverter.

The comparator circuit 111 operates according to a power voltage VDD (e.g., 1.8 volts). The comparator circuit 111 and the amplifier circuit 112 are coupled at a node N2. The comparator circuit 111 compares a reference voltage VREF and a feedback voltage VFB to generate a comparison voltage VM at the node N2. The amplifier circuit 112 operates according to the power voltage VDD. The amplifier circuit 112 generates an amplifying voltage VG according to the comparison voltage VM. A first terminal of the transistor M1 receives the input voltage VIN (e.g., 1.1 volts), a second terminal of the transistor M1 is coupled to the output terminal OUT, and a control terminal of the transistor M1 receives the amplifying voltage VG. The transistor M1 generates the output voltage VOUT at the output terminal OUT according to the input voltage VIN and the amplifying voltage VG. The resistor circuit R1 is coupled between a node N1 and a ground terminal GND. The resistor circuit R2 is coupled between the output terminal OUT and the node N1. In this configuration, the resistor circuit R1 and the resistor circuit R2 form a voltage-dividing circuit. The feedback voltage VFB is generated at the node N1.

A resistor voltage-dividing ratio of the resistor circuit R1 and the resistor circuit R2 is derived as formula (1) below:

$$\beta = \frac{r1}{r1 + r2} \tag{1}$$

in which r1 is a resistance value of the resistor circuit R1, r2 is a resistance value of the resistor circuit R2, and β is the resistor voltage-dividing ratio of the resistor circuit R1 and the resistor circuit R2.

A relationship of the feedback voltage VFB and the output voltage VOUT is as formula (2) below:

$$VFB = VOUT \times \beta = VOUT \times \left(\frac{r1}{r1 + r2}\right) \tag{2}$$

In addition, as illustrated in FIG. 2, the load capacitor CL is coupled between the output terminal OUT and the ground terminal GND. The compensation capacitor CC is coupled between the node N2 and the output terminal OUT.

Figure 3:
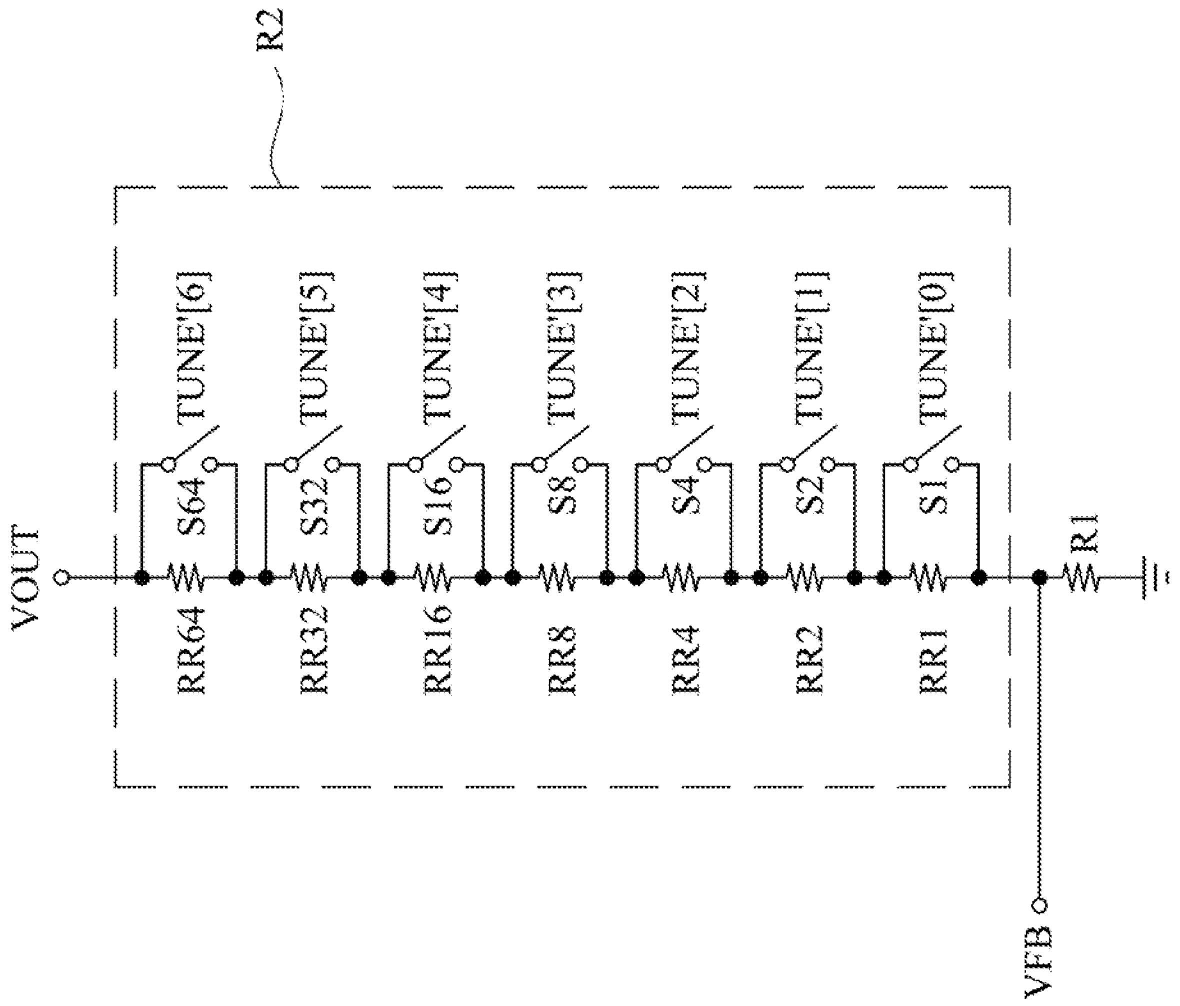
FIG. 3 is a schematic diagram of two resistor circuits in FIG. 2 according to some embodiments of the present disclosure.

Reference is made to FIG. 3. FIG. 3 is a schematic diagram of two resistor circuits R1-R2 in FIG. 2 according to some embodiments of the present disclosure.

As illustrated in FIG. 3, the resistor circuit R2 includes a plurality of resistors RR1, RR2, RR4, RR8, RR16, RR32, and RR64 and a plurality of switches S1, S2, S4, S8, S16, S32, and S64. The resistors RR1, RR2, RR4, RR8, RR16, RR32, and RR64 are coupled in series. Each switch and a corresponding resistor are coupled in parallel. For example, the switch S1 and the resistor RR1 are coupled in parallel, the switch S2 and the resistor RR2 are coupled in parallel, and so on. The switches S1, S2, S4, S8, S16, S32, and S64 are, for example, implemented by N-type transistors, and control terminals of the switches S1, S2, S4, S8, S16, S32, and S64 (e.g., gate terminals of transistors) receive the inversion adjustment signals TUNE'[0], TUNE'[1], TUNE'[2], TUNE'[3], TUNE'[4], TUNE'[5], and TUNE'[6] respectively. For example, when a voltage level of the inversion adjustment signal TUNE'[6] is a logic value 1, the switch S64 is turned on. When the voltage level of the inversion adjustment signal TUNE'[6] is a logic value 0, the switch S64 is turned off. Other inversion adjustment signals have similar operations, so they are not described herein again. In another embodiment, the control terminals of the switches S1, S2, S4, S8, S16, S32, and S64 receive the adjustment signals TUNE[0:6] generated from the digital controller 120 respectively, the switches S1, S2, S4, S8, S16, S32, and S64 are turned on or turned off according to the adjustment signals TUNE[0:6], and the switches are, for example, implemented by P-type transistors.

Figure 4:
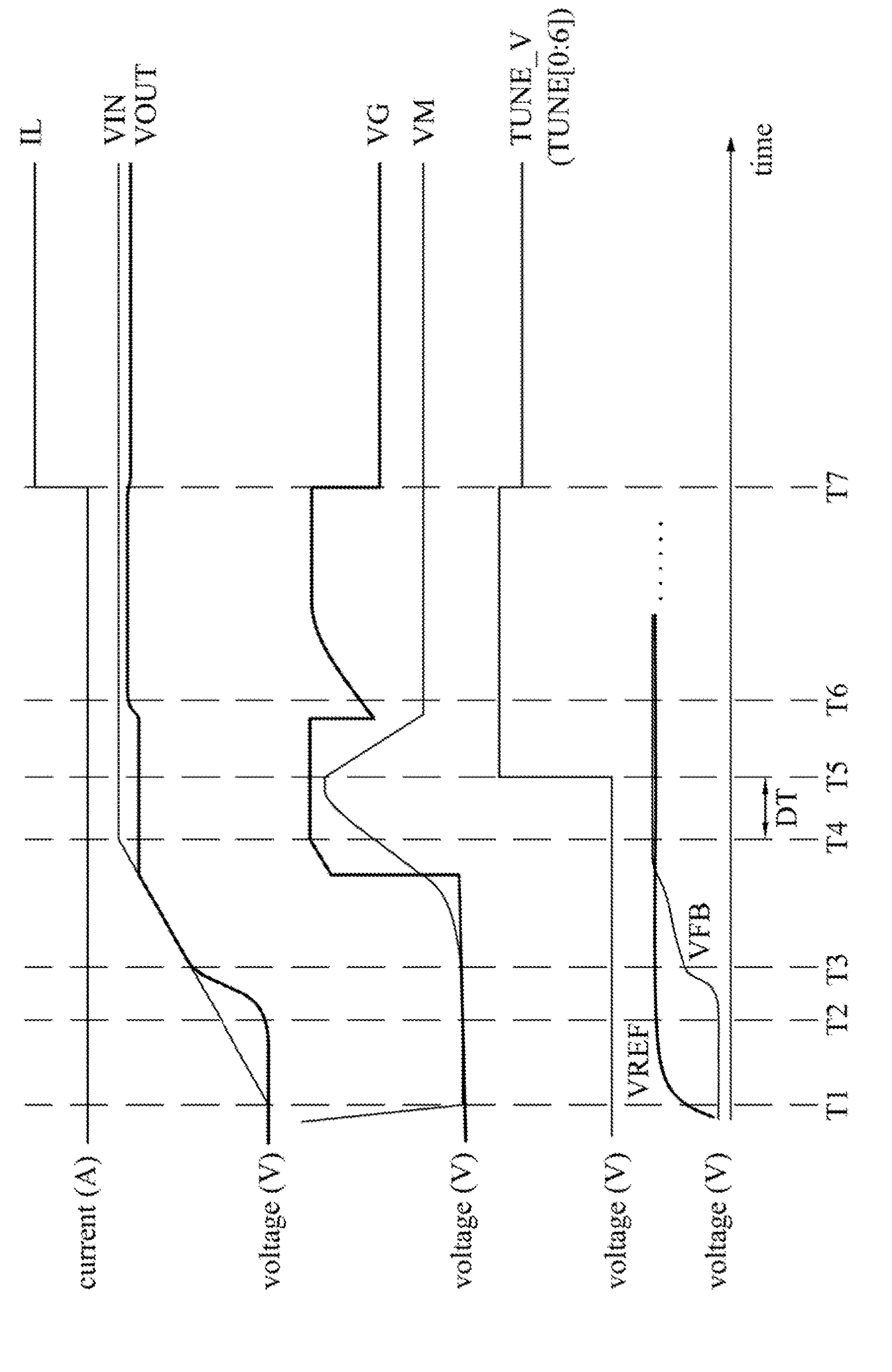
FIG. 4 is a waveform diagram of a plurality of signals according to some embodiments of the present disclosure.

References are made to FIG. 2-FIG. 4. FIG. 4 is a waveform diagram of a plurality of signals according to some embodiments of the present disclosure.

Following paragraphs take a 1.1 volts to 1 volt low dropout regulator as an example. In other words, the maximum voltage of the input voltage VIN is 1.1 volts, and a final target voltage of the output voltage VOUT is 1 volt. However, the present disclosure is not limited to this example.

At first, as illustrated in FIG. 4, during a timing point T1 to a timing point T5, the digital controller 120 can set an adjustment voltage TUNE_V to be smaller (e.g., a first value). The adjustment voltage TUNE_V can correspond to a decimal value of the adjustment signals TUNE[0:6]. Details will be described in following paragraphs.

At the timing point T1 (a start-up timing point), the low-dropout regulator 110 starts up and the input voltage VIN increases from 0 volts. At this time, since the negative feedback steady state of the low-dropout regulator 110 has not been established, voltage levels of the comparison voltage VM and the amplifying voltage VG correspond to the logic value 0. In addition, since the input voltage VIN is smaller at this time, a voltage difference between the input voltage VIN and the amplifying voltage VG has not reached the threshold voltage of the transistor M1. Accordingly, the transistor M1 is turned off.

At the timing point T2, since the voltage difference between the input voltage VIN and the amplifying voltage VG reaches the threshold voltage of the transistor M1, the transistor M1 is turned on. Since the transistor M1 is turned on, the output voltage VOUT increases according to the input voltage VIN and the output voltage VOUT is close to the input voltage VIN.

Based on formula (2) above, when the output voltage VOUT increases according to the input voltage VIN, the feedback voltage VFB increases.

At the timing point T3, when a voltage difference between the feedback voltage VFB and the reference voltage VREF is smaller than a threshold value, the comparison voltage VM outputted from the comparator circuit 111 increases. Since the comparison voltage VM increases, the amplifying voltage VG outputted from the amplifier circuit 112 increases. In this example, based on the amplify gain of the amplifier circuit 112, a rising slope of the amplifying voltage VG is larger than that of the comparison voltage VM. Since the voltage level of the amplifying voltage VG rapidly rises to the logic value 1, the transistor M1 is turned off such that the output voltage VOUT no longer rises.

As described above, the adjustment voltage TUNE_V is smaller at this time (e.g., a first value). Effectively, the adjustment signals TUNE[0:6] is smaller. Since the inversion adjustment signals TUNE'[0:6] is the inversion of the adjustment signals TUNE[0:6], the inversion adjustment signals TUNE'[0:6] is larger at this time. As illustrated in FIG. 3, when the inversion adjustment signals TUNE'[0:6] is larger, a resistance value r2 of the resistor circuit R2 is smaller (e.g., a first resistance value). Based on formula (1) above, when the resistance value r2 is smaller, the resistor voltage-dividing ratio β is larger. In other words, the adjustment voltage TUNE_V and the resistance value r2 of the resistor circuit R2 are with the positive correlation, but the adjustment voltage TUNE_V and the resistor voltage-dividing ratio β are with the negative correlation.

In addition, based on formula (2) above, when the low-dropout regulator 110 is locked (i.e., the feedback voltage VFB is locked at a fixed value), the resistor voltage-dividing ratio β and the output voltage VOUT are with the negative correlation. To be more specific, since the adjustment voltage TUNE_V and the resistor voltage-dividing ratio β are with the negative correlation, the adjustment voltage TUNE_V and the target voltage of the output voltage VOUT are with the positive correlation. In other words, when the adjustment voltage TUNE_V is smaller, the target voltage of the output voltage VOUT is smaller. As described above, since the adjustment voltage TUNE_V is smaller (e.g., the first value) at this time, the target voltage of the output voltage VOUT (e.g., 0.9 volts) is smaller than the final target voltage (e.g., 1 volt) at this time.

During operations, when the transistor M1 is turned on, the output voltage VOUT may have a slight overshoot and exceeds the current target voltage. In other words, the output voltage VOUT is slightly larger than the current target voltage (e.g., 0.9 volts). For example, the output voltage VOUT may be overshoot to 0.95 volts. However, although the output voltage VOUT (e.g., 0.95 volts) is slightly larger than the current target voltage (e.g., 0.9 volts), the output voltage VOUT (e.g., 0.95 volts) is still smaller than the final target voltage (e.g., 1 volt).

Then, as described above, the digital controller 120 can detect whether the input voltage VIN reaches the maximum voltage (e.g., 1.1 volts). As illustrated in FIG. 4, at the timing point T4, the detection result signal DS of the digital controller 120 indicates that the input voltage VIN reaches the maximum voltage (e.g., 1.1 volts).

Then, after a delay time DT (at the timing point T5), the digital controller 120 can set the adjustment voltage TUNE_V to be larger (e.g., a second value larger than the first value). In other words, the resistance value r2 of the resistor circuit R2 is set to be larger (e.g., a second resistance value larger than the first resistance value). As described above, the adjustment voltage TUNE_V and the target voltage of the output voltage VOUT are with the positive correlation. In other words, when the adjustment voltage TUNE_V is larger, the target voltage of the output voltage VOUT is pulled up from 0.9 volts to a higher level such that the output voltage VOUT increases to the final target voltage (e.g., 1 volt), as a timing point T6. Thus, the low-dropout regulator 110 can lock the output voltage VOUT at the final target voltage (e.g., 1 volt) without exceeding the final target voltage (e.g., 1 volt) so as to enter the locked state fast.

In some related approaches, the output voltage of the low dropout regulator exceeds the final target voltage and the low dropout regulator remains in an out-of-lock state for a long period. At this time, if the load starts to operate, the output voltage of the low dropout regulator may suffer from serious undershoot problem.

Compared to the aforementioned approaches, in the present disclosure, the digital controller 120 can set the adjustment voltage TUNE_V to be smaller at first (the resistance value r2 of the resistor circuit R2 is smaller). After the input voltage VIN reaches the maximum voltage, the adjustment voltage TUNE_V can be set to be larger (the resistance value r2 of the resistor circuit R2 becomes larger). Accordingly, it can prevent the output voltage VOUT from exceeding the final target voltage and can make the low-dropout regulator 110 to enter the lock state fast. Since the low-dropout regulator 110 enters the lock state fast, the output voltage VOUT does not suffer from the serious undershoot problem even if the load starts to operate.

Figure 5:
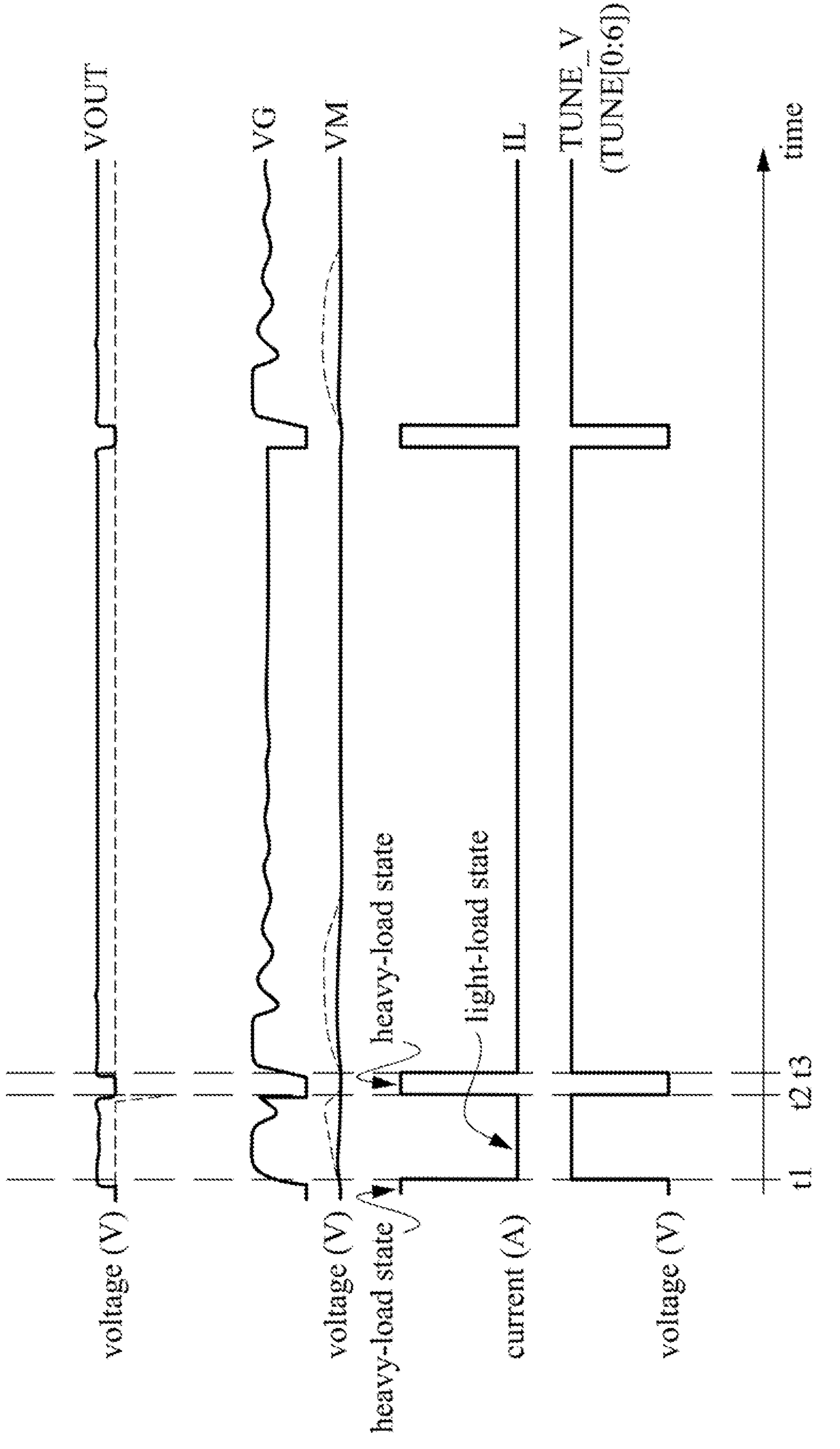
FIG. 5 is a waveform diagram of a plurality of signals according to some embodiments of the present disclosure.

Reference is made to FIG. 5. FIG. 5 is a waveform diagram of a plurality of signals according to some embodiments of the present disclosure.

In some embodiments, the load coupled to the output terminal OUT changes between a heavy-load state and a light-load state. For example, when the load current IL is relatively larger, the load is in the heavy-load state. When the load current IL is relatively smaller, the load is in the light-load state.

At the timing point T1, the load changes from the heavy-load state (the load current IL is relatively larger) to the light-load state (the load current IL is relatively smaller).

During a period between the timing point T1 and the timing point T2, the load is in the light-load state (the load current IL is relatively smaller). When the load is in the light-load state, the digital controller 120 can set the adjustment voltage TUNE_V to be larger (e.g., a third value). As described above, the adjustment voltage TUNE_V and the resistor voltage-dividing ratio β are with the negative correlation. In addition, based on formula (2) above, the resistor voltage-dividing ratio β and the feedback voltage VFB are with the positive correlation. In other words, when the adjustment voltage TUNE_V is larger, the resistor voltage-dividing ratio β is smaller and the feedback voltage VFB is smaller.

At the timing point T2, the load changes from the light-load state (the load current IL is relatively smaller) to the heavy-load state (the load current IL is relatively larger). The digital controller 120 can set the adjustment voltage TUNE_V to be smaller (e.g., a fourth value smaller than the third value).

In some related approaches, when the load changes from the heavy-load state to the light-load state (corresponding to the timing point T1 in the present disclosure), the comparison voltage increases (as the dotted line corresponding to the comparison voltage VM in FIG. 5) such that the amplifying voltage increases to turn off the back-end transistor, and then the back-end transistor stops providing the current or provides a smaller current. However, it takes a period of time for the comparison voltage to return to a low level (a steady state). When the load changes from the light-load state to the heavy-load state in a condition that the period of time is too short (the comparison voltage has not returned to the low level) (i.e., a unsteady state), the output voltage will suffer from the serious undershoot problem (as the dotted line corresponding to the output voltage VOUT in FIG. 5).

Compared to the related approaches, in the present disclosure, when the load is in the light-load state, the digital controller 120 sets the adjustment voltage TUNE_V to be larger (the resistance value r2 of the resistor circuit R2 is larger) such that the resistor voltage-dividing ratio β is smaller and the feedback voltage VFB is smaller. Since the feedback voltage VFB is smaller, the comparison voltage VM outputted from the comparator circuit 111 is not easy to increase. Accordingly, the period of time for the comparison voltage VM to return to the low voltage level (the steady state) can be shorter. In this situation, when the load changes from the light-load state to the heavy-load state, the output voltage VOUT will not suffer from the serious undershoot problem (as the solid line corresponding to the output voltage VOUT in FIG. 5).

Then, at the timing point T3, the load changes from the heavy-load state (the load current IL is relatively larger) to the light-load state (the load current IL is relatively smaller). The digital controller 120 can set the adjustment voltage TUNE_V to be larger (e.g., the third value). In short, when the load is in the light-load state, the digital controller 120 can set the adjustment voltage TUNE_V to be larger. When the load is in the heavy-load state, the digital controller 120 can set the adjustment voltage TUNE_V to be smaller.

Based on the aforementioned descriptions about FIG. 5, during a time period between the time point T5 and a time point T7 in FIG. 4, the load is in the light-load state (the load current IL is relatively smaller), the digital controller 120 can set the adjustment voltage TUNE_V to be larger (e.g., the second value larger than the first value) such that the resistance value r2 of the resistor circuit R2 is larger (e.g., the second resistance value). After the time point T7, the load is in the heavy-load state (the load current IL is relatively larger), the digital controller 120 can set the adjustment voltage TUNE_V to be smaller (e.g., the third value which is smaller than the second value but larger than the first value) such that the resistance value r2 of the resistor circuit R2 is smaller (e.g., the third resistance value which is smaller than the second resistance value but larger than the first resistance value). This can avoid the serious undershoot problem of the output voltage VOUT.

Figure 6:
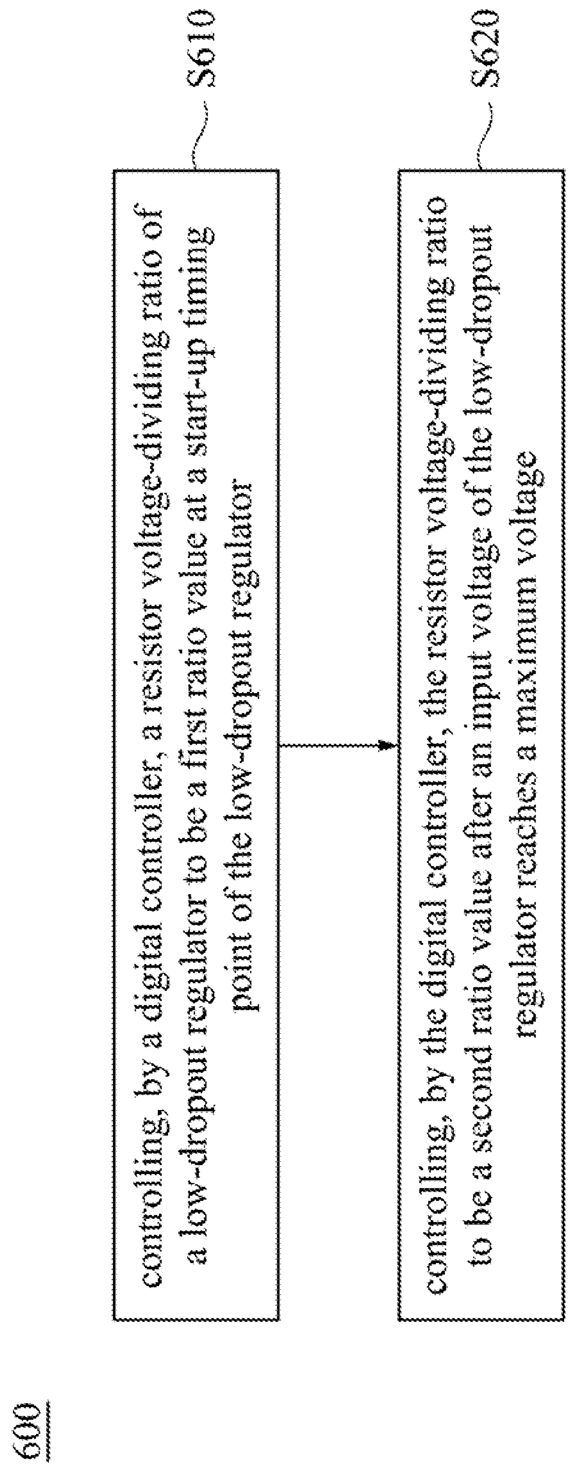
FIG. 6 is a flow diagram of a control method according to some embodiments of the present disclosure.

Reference is made to FIG. 6. FIG. 6 is a flow diagram of a control method 600 according to some embodiments of the present disclosure.

In some embodiments, the control method 600 can be implemented to the low-dropout regulator system 100 in FIG. 1, but the present disclosure is not limited thereto. However, for better understanding, the control method 600 is described with the low-dropout regulator system 100 in FIG. 1.

As illustrated in FIG. 6, the control method 600 includes operations S610 and S620.

In operation S610, at the start-up timing point (e.g., the timing point T1 in FIG. 4) of the low-dropout regulator 110, the digital controller 120 controls the resistor voltage-dividing ratio β of the low-dropout regulator 110 to be a first ratio value. As described above, during the timing point T1 to the timing point T5, the digital controller 120 can set the adjustment voltage TUNE_V to be smaller, and the adjustment voltage TUNE_V and the resistor voltage-dividing ratio β are with the negative correlation. Effectively, the resistor voltage-dividing ratio β is larger.

In operation S620, after the input voltage VIN of the low-dropout regulator 110 reaches the maximum voltage (e.g., 1.1 volts), the digital controller 120 controls the resistor voltage-dividing ratio β to be a second ratio value, and the second ratio value is smaller than the first ratio value in operation S610. To be more specific, at the timing point T5, the digital controller 120 can set the adjustment voltage TUNE_V to be larger. Effectively, the resistor voltage-dividing ratio β is smaller.

As described above, in the present disclosure, the serious undershoot problem of the output voltage can be avoided to improve the performance of the low-dropout voltage regulator.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A low-dropout regulator system, comprising:
- a low-dropout regulator, comprising:
  - a comparator circuit configured to generate a comparison voltage according to a reference voltage and a feedback voltage;
  - an amplifier circuit configured to generate an amplifying voltage according to the comparison voltage;
  - a transistor configured to receive an input voltage and controlled by the amplifying voltage to generate an output voltage at an output terminal;
  - a first resistor circuit coupled between a first node and a ground terminal, wherein the feedback voltage is generated at the first node; and
  - a second resistor circuit coupled between the output terminal and the first node,
  - wherein between a start-up timing point of the low-dropout regulator and a maximum-voltage timing point when the input voltage reaches a maximum voltage, a resistance value of the second resistor circuit is a first resistance value,
  - wherein after the input voltage reaches the maximum voltage, the resistance value of the second resistor circuit is changed from the first resistance value to a second resistance value, wherein the second resistance value is larger than the first resistance value.

2. The low-dropout regulator system of claim 1, wherein the second resistor circuit comprises:
- a plurality of resistors coupled in series; and
- a plurality of switches, wherein each of the switches is coupled in parallel with a corresponding one of the resistors.

3. The low-dropout regulator system of claim 2, further comprising:
- a digital controller configured to detect whether the input voltage reaches the maximum voltage and generate a plurality of adjustment signals to control the switches.

4. The low-dropout regulator system of claim 3, wherein the switches are configured to receive the adjustment signals respectively.

5. The low-dropout regulator system of claim 1, wherein after the input voltage reaches the maximum voltage, the resistance value of the second resistor circuit is changed from the first resistance value to the second resistance value.

6. The low-dropout regulator system of claim 1, wherein before the input voltage reaches the maximum voltage, the output voltage is smaller than a final target voltage of the low-dropout regulator system.

7. The low-dropout regulator system of claim 1, further comprising:

a compensation capacitor coupled between a second node and the output terminal, wherein the comparator circuit and the amplifier circuit are coupled at the second node.

8. The low-dropout regulator system of claim 1, wherein when the low-dropout regulator changes from a light-load mode to a heavy-load mode, the resistance value of the second resistor circuit is changed from the second resistance value to a third resistance value, wherein the third resistance value is smaller than the second resistance value.

9. The low-dropout regulator system of claim 8, wherein the third resistance value is larger than the first resistance value.

10. The low-dropout regulator system of claim 8, wherein when the low-dropout regulator changes from the heavy-load mode to the light-load mode, the resistance value of the second resistor circuit is changed from the third resistance value to the second resistance value.

11. A control method for a low-dropout regulator system, wherein the control method comprises:

controlling, by a digital controller, a resistor voltage-dividing ratio of a low-dropout regulator to be a first ratio value between a start-up timing point of the low-dropout regulator and a maximum-voltage timing point when an input voltage of the low-dropout regulator reaches a maximum voltage; and controlling, by the digital controller, the resistor voltage-dividing ratio to be a second ratio value from the first ratio value after the input voltage of the low-dropout regulator reaches the maximum voltage, wherein the second ratio value is smaller than the first ratio value.

12. The control method of claim 11, wherein the resistor voltage-dividing ratio is:

$$\beta = \frac{r1}{r1 + r2}$$

wherein β is the resistor voltage-dividing ratio, r1 is a resistance value of a first resistor circuit in the low-dropout regulator, r2 is a resistance value of a second resistor circuit in the low-dropout regulator, wherein the first resistor circuit is coupled between a node in the low-dropout regulator and a ground terminal, and the second resistor circuit is coupled between an output terminal in the low-dropout regulator and the node.

13. The control method of claim 12, wherein the resistance value of the second resistor circuit is a first resistance value at the start-up timing point, wherein after the input voltage reaches the maximum voltage, the resistance value of the second resistor circuit is a second resistance value, wherein the second resistance value is larger than the first resistance value.

14. The control method of claim 12, wherein the second resistor circuit comprises:

a plurality of resistors coupled in series; and a plurality of switches, wherein each of the switches is coupled in parallel with a corresponding one of the resistors.

15. The control method of claim 14, further comprising:

generating, by the digital controller, a plurality of adjustment signals to control the switches.

16. The control method of claim 14, further comprising:

detecting, by the digital controller, whether the input voltage reaches the maximum voltage.

* * * * *